United States Patent
Lee

(10) Patent No.: US 6,197,852 B1
(45) Date of Patent: Mar. 6, 2001

(54) POLYOLEFIN CONCENTRATES AND COMPOSITION HAVING IMPROVED CARBON BLACK DISPERSION

(75) Inventor: Chun D. Lee, Cincinnati, OH (US)

(73) Assignee: Equistar Chemicals, LP, Houston, TX (US)

(*) Notice: Subject to any disclaimer, the term of this patent is extended or adjusted under 35 U.S.C. 154(b) by 0 days.

(21) Appl. No.: 09/514,937

(22) Filed: Feb. 28, 2000

(51) Int. Cl.⁷ .............................. C08K 5/34; C08K 5/04; C08K 5/09

(52) U.S. Cl. ...................... 524/93; 524/399; 524/424; 524/520

(58) Field of Search ............................ 524/93, 399, 424, 524/520

(56) References Cited

U.S. PATENT DOCUMENTS

| | | |
|---|---|---|
| 2,997,456 | 8/1961 | Mills et al. . |
| 3,218,276 | 11/1965 | Ringwald et al. . |
| 4,260,661 | 4/1981 | Walters et al. . |
| 4,459,380 | 7/1984 | Vostovich . |
| 4,693,937 | 9/1987 | Wu et al. . |
| 4,797,323 | 1/1989 | Wu et al. . |
| 4,808,643 | 2/1989 | Lemoine et al. . |
| 4,824,883 | 4/1989 | Walters et al. . |
| 5,196,462 | 3/1993 | Berta . |
| 5,280,064 | 1/1994 | Hesp et al. . |
| 5,382,348 | 1/1995 | Muller et al. . |
| 5,494,966 | 2/1996 | Hesp et al. . |
| 5,708,061 | 1/1998 | Hesp . |

FOREIGN PATENT DOCUMENTS

| | | |
|---|---|---|
| 29 33 339 | 2/1981 | (DE) . |
| 9432 | 11/1979 | (EP) . |
| 557923 | 6/1993 | (EP) . |
| 329836 | 11/1998 | (EP) . |
| WO 93/07219 | 4/1993 | (WO) . |
| WO 94/14896 | 7/1994 | (WO) . |
| WO 94/22957 | 10/1994 | (WO) . |
| WO 97/28220 | 8/1997 | (WO) . |
| WO 97/30121 | 8/1997 | (WO) . |

OTHER PUBLICATIONS

C. VanBellingen and J.Accorsi: "The Impact of Carbon Black Morphology and Dispersion on the Weatherability of Polyethylene," The Impact of Wire & Cable Symposium Proceedings, 815–822 (1999).

T. Chen and J.R. Leech: "Design of Polyethylene Cable Jacket Compounds of Superior Jacketing Performance," International Wire & Cable Symposium Proceedings, 807–814 (1999).

Primary Examiner—Kriellion Sanders
(74) Attorney, Agent, or Firm—Gerald A. Baracka; William A. Heidrich

(57) ABSTRACT

Improved carbon black concentrates and extrusion compositions produced therefrom are provided. The extrusion compositions are resistant to thermo-oxidative degradation and have significantly improved carbon black dispersion rendering them useful for wire and cable and other applications. The concentrates are mixtures of a mercaptobenzimidazole compound, carbon black and polyolefin resin.

22 Claims, No Drawings

POLYOLEFIN CONCENTRATES AND COMPOSITION HAVING IMPROVED CARBON BLACK DISPERSION

BACKGROUND OF THE INVENTION

1. Field of the Invention

The present invention relates to improved carbon black concentrates and black-filled polyolefin extrusion compositions prepared therefrom.

2. Description of the Prior Art

The use of carbon black in thermoplastic compositions to impart ultraviolet (UV) light stabilization is well known. This approach is widely used with polyolefins utilized for outdoor applications such as for electrical and telecommunication wire and cable, agricultural film, geomembranes, plastic pipe and the like. Typically for these applications, loadings of up to about 2.5 weight percent carbon black are used.

While the carbon black provides some degree of protection against thermal and oxidative degradation, it is still generally considered advantageous to include one or more conventional stabilizers, such as hindered phenols and phosphites. Even with the inclusion of additional stabilizers, such as hindered phenols and phosphites, significant degradation can occur during stoppages such as when lines are converted to run different products. Such stoppages can take up to several hours during which time extrusion resin remains in the processing equipment. Significant localized degradation can occur during such stoppages so that when the line is restarted significant gel particles are present in the extrudate producing a rough and undesirable product. The problem can be so severe that in some instances it is necessary to purge the entire system using a purge resin before the normal extrusion coating operation can be resumed.

The ability to provide effective UV protection depends not only on the type and amount of black but also on the dispersion quality of the carbon black in the polyolefin. It is generally recognized that smaller particle size carbon blacks (higher surface area) increase UV protection and absorption. On the other hand, these smaller particle size blacks are more difficult to disperse in plastic materials. Therefore, even when utilizing small particle size blacks, care must be taken to disperse the carbon black uniformly within the polymer matrix if optimum UV stabilization is to be achieved.

The influence of carbon black dispersion on UV stability and weathering performance is discussed in an article by C. VanBellingen and J. Accorsi, International Wire & Cable Symposium Proceedings, 1999, pp 815–822, entitled "The Impact of Carbon Black Morphology and Dispersion on the Weatherability of Polyethylene." The authors conclude that weatherability and retention of physical properties directly depend on dispersion quality since poor dispersion results in larger agglomerates which have a tendency to scatter UV light rather than absorb it.

To most effectively incorporate and disperse carbon blacks in polyolefin resins at the levels utilized for UV stabilization, masterbatch procedures are most commonly used. These procedures involve first preparing a concentrate, i.e., masterbatch, having a relatively high concentration of the carbon black using a resin in which the carbon black is readily dispersed and which is compatible with the "end-use" resin. Other additives, such as antioxidants and the like, may be included in the masterbatch if desired. Typically, the resin used for the concentrate will be the same as the end-use resin or will be a resin from the same polymer family but having better processability than the end-use resin. The concentrate is then "let-down" into the end-use resin to achieve the desired carbon black loading in the final product. This technique eliminates the need for the processor to handle messy dry carbon black powder and minimizes the processing/equipment required in order to achieve satisfactory dispersion of the carbon black in the end-use resin.

Benzimidazole compounds are known stabilizers for thermoplastic resins such as polyethylenes and polypropylene. U.S. Pat. No. 3,218,276 discloses the use of alkyl benzimidazoles to stabilize fiber-forming polyolefins. Polypropylene fiber-forming compositions containing 0.2 to 2.0 percent benzimidazole with other conventional additives are disclosed.

U.S. Pat. No. 2,997,456 teaches the use of metallic mercaptobenzimidazole compounds as stabilizers for polymers of 1-olefins, primarily polypropylene, to protect against molecular degradation under conditions of elevated temperature and/or mechanical working and zinc mercaptobenzimidazole is specifically mentioned.

The combination of hindered phenols with various zinc salts of mercapto compounds to stabilize polyolefins is taught in U.S. Pat. Nos. 4,260,661; 4,693,937; 4,797,323 and 4,824,883. For example, combinations of IRGANOX 1010 with the zinc salts of 2-mercaptobenzimidazole and 2-mercaptotolylimidazole are disclosed.

Other references which disclose benzimidazole stabilizers for polymeric materials include U.S. Pat. Nos. 4,459,380; 4,808,643 and 5,196,462.

SUMMARY OF THE INVENTION

It is an object of the present invention to provide improved carbon black concentrates. It is a further object to provide carbon black-filled polyolefin extrusion compositions which are resistant to thermo-oxidative degradation and have significantly improved dispersion of carbon black utilizing the improved carbon black concentrates. These and other objects are achieved with the present invention.

The improved carbon black concentrates of the invention comprise 30 to 75 weight percent, based on the total weight of the concentrate, polyolefin having a melt index from 0.1 to 100 g/10 min and density typically greater than 0.910 g/cm$^3$, 25 to 70 weight percent carbon black and 0.20 to 2.5 weight percent mercaptobenzimidazole compound of the formula

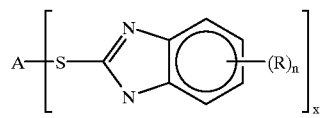

where A is hydrogen or zinc, R is a $C_{1-4}$ alkyl group, n is 0 to 4 and x is 1 or 2.

Extrusion compositions having improved carbon black dispersion are obtained by melt-blending the above-defined carbon black concentrate with an extrusion-grade ethylene homopolymer or copolymer resin at a weight ratio (extrusion resin:concentrate) of 5:1 to 25:1.

In one highly useful embodiment of the invention, the concentrate polyolefin is LDPE or LLDPE and is combined with a carbon black having a particle size from 10 to 30 nanometers, 2-mercaptotolylimidazole or zinc 2-mercaptotolylimidazole and a metal carboxylate or fluoroelastomer processing aid. Especially advantageous extrusion compositions result when such concentrates are let-down into LLDPE, MDPE or HDPE at weight ratios from 1:10 to 1:20.

DETAILED DESCRIPTION

The present invention relates to carbon black concentrates and their use as masterbatches to obtain extrusion compositions containing carbon black levels which render them resistant to UV degradation and having improved dispersion of the carbon black therein. By virtue of their resistance to UV, compositions obtained in accordance with the invention may be used to produce articles suitable for outdoor use including film, pipe, sheeting and insulated and jacketed wire and cable.

The carbon black concentrate, or masterbatch as it is also referred to herein, is comprised of a polyolefin, carbon black and mercaptobenzimidazole compound. The masterbatch which may also contain other additives is let-down in the appropriate ratio into the polyolefin being formulated. The polyolefin being formulated to obtain the final extrusion composition may be the same polyolefin or a different polyolefin from that employed to prepare the concentrate. As used herein, the terms end-use polyolefin or base resin refer to the former whereas concentrate (or masterbatch) polyolefin (or resin) refers to the latter.

For preparation of the concentrate, ethylene homopolymers and copolymers having melt indexes from 0.1 to 100 g/10 min and densities greater than 0.910 g/cm$^3$ are used. Polymer mixtures may also be used. Polyolefins of this type are available from commercial sources and include low density polyethylene (LDPE), linear low density polyethylene (LLDPE), medium density polyethylene (MDPE) and high density polyethylene (HDPE). Copolymers preferably contain minor amounts of $C_{3-8}$ α-olefin comonomers such as propylene, butene-1, hexene-1 and octene-1; however, copolymers of ethylene with comonomers having functional groups, such as vinyl carboxylates, alkyl acrylates and alkyl methacrylates, may also be used for all or a portion of the masterbatch resin. Vinyl acetate and n-butyl acrylate are useful functional comonomers. Ethylene homopolymers and copolymers of ethylene with butene-1 or hexene-1 are particularly advantageous resins for preparation of the masterbatch.

The density of the polyolefin used for the masterbatch can be as high as 0.96 g/cm$^3$ but, most generally, will be from 0.910 to 0.950 g/cm$^3$. LDPEs and LLDPEs having densities from 0.915 to 0.930 g/cm$^3$ are particularly useful masterbatch resins. LDPEs with densities from 0.917 to 0.925 g/cm$^3$ have good processability and are especially advantageous, particularly for preparation of concentrates when utilizing smaller particle size carbon blacks. The melt index of the masterbatch resin will preferably range from 0.5 to 50 g/10 min and, more preferably, from 0.5 and 20 g/10 min.

While the present invention can be utilized with virtually all types of industrial carbon blacks, including those having larger particle sizes, it is particularly advantageous for use with the smaller particle size carbon blacks since these blacks are the most difficult to effectively disperse in thermoplastic materials. The carbon blacks can range in size up to about 100 nanometers (nm) or above; however, for most thermoplastic applications carbon blacks with particle sizes from 10 up to about 60 nm are employed. Carbon black particle sizes are average or mean values determined using electron microscopic techniques such as ASTM D3849. Since smaller particle size carbon blacks are most effective to impart UV protection, in a preferred embodiment of the invention, carbon blacks having particle sizes from 10 up to about 30 nm are used. Representative carbon blacks include RAVEN 880 and RAVEN C ULTRA, manufactured by Columbian Chemicals Company; VULCAN P and VULCAN 9A32, manufactured by Cabot Corporation; and PRINTEX P and PRINTEX 90, manufactured by DeGussa AG. The invention is equally effective with higher structure conductive carbon blacks.

A mercaptobenzimidazole compound is included with the carbon black in order to obtain concentrates with improved dispersion. Useful mercaptobenzimidazoles for this purpose have the formula

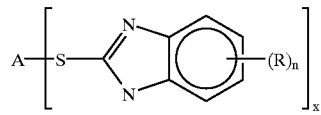

where A is hydrogen or zinc, R is a $C_{1-4}$ alkyl group, n is 0 to 4 and x is 1 or 2. Preferably, R is methyl and n is 0 or 1. Whereas mercaptobenzimidazole compounds of the above types are known and have been used as stabilizers for rubbers and thermoplastics, they have not heretofore been used in carbon black concentrates to enhance dispersion of carbon black therein. Preferred mercaptobenzimidazole compounds based on their commercial availability include 2-mercaptotolylimidazole (MTI), 2-mercaptobenzimidazole (MBNI), zinc 2-mercaptobenzimidazole (ZMBI) and zinc 2-mercaptotolylimidazole (ZMTI).

The concentrates will contain from 30 to 75 weight percent ethylene homopolymer or copolymer, 25 to 70 weight percent carbon black and 0.20 to 2.5 weight percent mercaptobenzimidazole compound. Weight percentages are based on the total weight of the concentrate. In one highly useful embodiment of the invention, the concentrate contains 35 to 65 weight percent polyolefins, 35 to 65 weight percent carbon black and 0.3 to 1.5 weight percent mercaptobenzimidazole compound.

To effectively disperse the carbon black in the concentrate, which is essential if improved carbon black dispersion is to be achieved in the final extrusion composition, the polyolefin, carbon black and mercaptobenzimidazole compound are combined and melt blended in an intensive mixer, such as a Banbury mixer, until the carbon black is uniformly dispersed therein. The mixing time will vary depending primarily on the specific type of polyolefin and carbon black being used and the weight ratio of these two components. Care must be exercised to avoid excessive mixing which can result in a buildup of frictional heat and lead to thermal decomposition of the polyolefin. Acceptability of carbon black dispersion in the concentrate is usually determined in accordance with standard manufacturing procedures wherein screenpacks in the processing line are periodically examined and checked for entrapped carbon black particles.

In accordance with standard masterbatch procedures, conventional additives to be incorporated in the extrusion composition can also be included in the concentrate. Such additives may include antioxidants, stabilizers, processing aids, nucleating agents, flame retarding materials, fillers, metal deactivators and the like. These additives are known in the art and are generally used at relatively low levels in the end-use composition. Since carbon blacks and mercaptobenzimidazole compounds are both known to impart antioxidative properties, incorporation of additional antioxidants and stabilizers may not be necessary except for the most rigorous applications.

In one useful embodiment of the invention processing aids are included in the masterbatch. The incorporation of processing aids facilities dispersion of the carbon black in the concentrate and also improves blending when the concentrate and end-use resin are combined. Processing aids are employed at levels ranging from 0.1 to 2.5 weight percent and, more preferably, from 0.25 to 1.25 weight percent, based on the total weight of the concentrate. Conventional processing aids used for this purpose include metal carboxylates, such as zinc stearate, calcium stearate, aluminum stearate, polyolefin waxes, fluoroelastomers, long-chain fluorinated carboxylic acid esters or salts, and the like.

The amount of carbon black concentrate let-down into the end-use resin in order to obtain the extrusion composition will vary depending on the amount of carbon black in the concentrate and the carbon black level desired in the final extrusion composition. Generally the weight ratio of concentrate to end-use resin will range from 25:1 to 5:1 and, more preferably, be from 20:1 to 10:1. Extrusion compositions obtained when the concentrate and end-use resin are combined and melt blended in the prescribed ratios have melt indexes generally ranging from 0.1 to 15 g/10 min and, more preferably, from 0.5 to 10 g/10 min. The concentrate and base resin are melt blended using conventional melt mixers, extruders or the like. The extrusion composition may be used directly or it can be pelletized and stored/shipped for later use.

The end-use or base resin to which the concentrate is added may be the same resin used to prepare the concentrate or it may be a different resin but selected from the same general family of resins, namely, ethylene homopolymers or copolymers of ethylene with $C_{3-8}$ α-olefins or functionalized comonomers. Whereas the concentrate resin is most generally selected based on processability and ease of dispersibility of carbon black and other additives therein, the base resin, which comprises the major constituent of the extrusion composition, will be selected primarily based on its ability to obtain the desired physical properties in the intended end-use application. For this reason, prefeffed end-use resins include LLDPE, MDPE and HDPE having melt indexes and densities within the same general ranges as described for the concentrate resins.

The end-use resin may be a "barefoot" resin, i.e., contain no additives of any type, or it may contain small amounts of additives or stabilizers carried over from the polymerization operation or incorporated during post-polymerization processing. Since most polyolefins are obtained from the polymerization reactor as powders, they are generally subjected to post-reactor processing wherein the powders are converted to more easily handled pelletized products. Stabilizers of various types are often incorporated at low levels to prevent degradation during such processing or subsequent storage/shipment of the pelletized resin. Typically, however, the primary stabilizer components required to impart the necessary thermal, oxidative and light protection to the finished article over its projected life will be included in a concentrate and incorporated with the end-use resin during manufacture of the finished article. In this way, a single base resin can be used for the manufacture of several articles having diverse applications and additive requirements met simply by using a different concentrate.

While the extrusion compositions are particularly well suited for insulation and jacketing for wire and cable, including fiber optic cables, they may also be used for foam skin wire and cable applications, the manufacture of pipe, production of mono- or multilayer films, etc. They may be extrusion coated onto various rigid or flexible substrates such as glass, fabric, foil, wood, paper, composite materials and the like. When coextruded they can be applied with one or more other thermoplastic resins or thermoplastic resin blends.

The concentration of carbon black in the extrusion composition will depend on the end-use application for which the extrusion composition will be used but typically range from about 0.75 up to about 35 weight percent of the total composition. For example, for communication cable or power cable jacketing, a typical carbon black loading would be about 2.6 weight percent. Similar loadings would be utilized when manufacturing tapes used to wrap steel pipes to protect against corrosion. On the other hand, extrusion compositions used to manufacture industrial or potable water pipe, agricultural film and pond liners would generally contain from 1 to 2 weight percent carbon black. Much higher carbon black loadings, up to as high as 35 weight percent or above, are employed for conductive applications such as when the extrusion compositions are to be used for the semi-conductive layer of power transmission cables.

In a particularly useful embodiment of the invention, extrusion compositions produced when the above-defined carbon black concentrates are let-down into polyolefin base resins are used for wire and cable applications either as the primary insulation or as one of the layers in a multi-layer power transmission cable construction. For the latter applications, the compositions of the invention are most advantageously used as the exterior jacket or sheathing layer which provides long-term durability by absorbing UV radiation. By utilizing a conductive black, extrusion compositions which can be used as a semi-conductive layer can also be obtained. Semi-conductive layers are utilized in power transmission cables to improve the electrical efficiency of the construction.

The improved dispersibility of carbon black obtained with the compositions of the invention is demonstrated using the standard industry practice of passing the black-filled composition through one or more screens of specified mesh. Efficiency of dispersion can then be determined by either visually examining the screen after a fixed period and counting the number of particles trapped in the screen or, as is used in the present situation, measuring the pressure rise due to screen blockage. Dispersion numbers (DN) reported herein were determined for the extrusion compositions utilizing the screen pack plugging procedure wherein the change in head pressure, i.e., pressure rise, in an extruder is measured over time. The test was conducted using a Haake System 90 single screw extruder with a heated (235° C.) die and a breaker plate followed by a 60-60-325-60 mesh screen pack. Extruder zones 1–3 were maintained at 235° C. and the extruder was operated at a screw speed of 150 rpm. Head pressure readings (in psi) were taken just before the screen pack after 5 and 25 minutes and the dispersion number calculated. DN is the difference between the two readings, i.e., $DN=P_{r25}-P_{r5}$. Dispersion numbers reported herein are for 5 weight percent carbon black loaded LDPE resin (density 0.919 g/cm³; MI 0.9 g/10 min). In general, dispersion numbers obtained with compositions prepared using the concentrates of the invention are 250 or less and, most typically, fall within the range 50–200. Particularly useful extrusion compositions of the invention have DNs less than 100.

The following examples illustrate the invention more fully. Unless otherwise indicated, all parts and percentages reported in the examples are on a weight basis. Densities are determined in accordance with ASTM Test Method D 1505. ASTM Test Method D 1238 was used to determine melt index.

All concentrates were prepared using a Farrel OOC. Banbury mixer having a capacity of 2400 cc. All of the ingredients were dry-blended and the preheated (35° C.) chamber of the Banbury filled with the mixture. A pressure of 40 psi was then applied with mixing (125 rpm). When flux was achieved, i.e., the temperature of the mixture in the chamber reached approximately 132° C. (usually about 40–50 seconds), the ram was raised for 15 seconds and any material collected in the throat of the mixer scraped into the mixing chamber. Pressure was reapplied and mixing continued for at least 3 minutes or until the temperature reached 171° C. The melt was then pelletized at 182° C. using a 3.25 inch single screw extruder (L/D=23; 10 rpm) connected to an underwater pelletizer. Each concentrate was let-down into the appropriate amount of LDPE resin in order to conduct the pressure rise test and determine the dispersion number.

EXAMPLE 1

A concentrate having the following composition was prepared in accordance with the above-described procedure:

| | |
|---|---|
| LLDPE (density 0.920 g/cm$^3$; MI 0.74 g/10 min) | 63.4% |
| Carbon Black (VULCAN 9A32; particle size 19 nm) | 35.0% |
| Fluoroelastomer (DYNAMAR FX-9613) | 0.3% |
| Zinc Stearate | 0.6% |
| MTI | 0.7% |

When let-down into the LDPE base resin used for the pressure rise test at a weight ratio of 1:6.6 the resulting extrusion composition containing 5 percent carbon black had a MI of 0.65 g/10 min and dispersion number of 81.

The superior dispersibility obtained with the extrusion composition prepared using the above-prepared concentrate containing the mercaptobenzimidazole compound was demonstrated by preparing two comparative extrusion compositions. The concentrates and extrusion compositions obtained therewith were prepared identically to that of the inventive example except that the MTI was omitted and a conventional antioxidant substituted therefor. For the first comparative concentrate 0.7% IRGANOX 1010 (pentaerythrityhetrakis (3-(3',5'-di-t-butyl-4-hydroxyphenyl)propionate) was used and the second comparative concentrate contained 0.7% NAUGARD SUPER Q (Polymerized 1,2-dihydro-2,2,4-trimethylaunoline). In both instances the dispersion numbers obtained for the compositions prepared using the concentrates without the MTI were markedly inferior. The DN of the extrusion composition obtained with the first comparative concentrate was 254 and the extrusion composition obtained using the second comparative concentrate had a DN of 222.

To demonstrate the superior thermo-oxidative stability obtained with the compositions of the invention two compositions each containing 10 percent carbon black were prepared using the concentrate of the invention and the first comparative concentrate. The base resin used in each instance was LDPE having a density of 0.919 g/cm$^3$ and MI of 0.9 g/10 min. Each composition was evaluated for heat stability by charging 40 grams of the composition into the mixing chamber of a Haake Rheomix operating at 60 rpm and 230° C. and monitoring torque variation over a period of 50 minutes. Torque initially drops to a minimum value as the blend melts but then gradually increases due to chain extension reactions. The value reported is the torque at 40 minutes normalized with respect to the initial melt torque. The torque value obtained using the blend prepared using the concentrate of the invention was 1.09 whereas the blend obtained using the first comparative concentrate was 1.43. These data clearly show the significantly improved thermo-mechanical stability of the inventive compositions.

The concentrate of the invention and the first comparative concentrate were also evaluated for wire extrusion performance. In this case the carbon black level of the extrusion composition was 2.6 percent and the base resin was the same LLDPE as used for the concentrate. The extrusion was conducted using a Davis-Standard single-screw extruder (2 inch; L/D=20) having the following temperature profile:

| | |
|---|---|
| Zone 1 | 160° C. |
| Zone 2 | 188° C. |
| Zone 3 | 204° C. |
| Zone 4 | 210° C. |
| Adapter | 216° C. |
| Dies 1 and 2 | 216° C. |

Die size was 0.102 inch. 18 AWG wire was extrusion coated to a thickness of 30 mils at a line speed of 160 fpm and screw speed of 20 rpm. Wire coated with the composition of the invention had better surface quality (by visual inspection) compared to insulated wire obtained using the first comparative concentrate. Also, the head pressure generated during extrusion of the composition of the invention was 250 psi less than the head pressure generated when running the comparative composition—confirming the improved carbon black dispersion numbers observed with the inventive compositions in the screen pack plugging test.

EXAMPLE 2

Example 1 was repeated using a different carbon black. RAVEN 880 ULTRA having a particle size of 30 nm was used. A dispersion number of 57 was obtained when the extrusion composition was evaluated in the pressure rise test.

EXAMPLES 3 and 4

Two concentrates were prepared using LDPE (density 0.918 g/cm$^3$; MI 9 g/10 min) and RAVEN 880 ULTRA carbon black. The concentrates had the following compositions:

| | Ex. 3 | Ex. 4 |
|---|---|---|
| LDPE | 64.05% | 64.05% |
| Carbon Black | 35.0% | 35.0% |
| Zinc Stearate | 0.3% | 0.3% |
| MTI | 0.65% | — |
| ZMTI | — | 0.65% |

Dispersion numbers obtained for extrusion compositions prepared from concentrate Ex. 3 and concentrate Ex. 4 were 125 and 140, respectively.

When the MTI and ZMTI were replaced with IRGANOX 1010 and IRGAFOS 168 (tris(2', 4',-di-t-butylphenyl) phosphite), the respective extrusion compositions obtained using these concentrates had dispersion numbers of 398 and 405.

EXAMPLE 5

To demonstrate the ability to obtain improved dispersibility when a conventional hindered phenolic antioxidant is included in the concentrate with the mercaptobenzimidazole compound, the following masterbatch formulation was prepared:

| | |
|---|---|
| LLDPE | 59.05% |
| Carbon Black | 40.0% |
| Zinc Stearate | 0.3% |
| IRGANOX 1010 | 0.35% |
| MTI | 0.30% |

The LLDPE and carbon black used were the same as employed in Example 1. The dispersion number of the extrusion composition produced using the above-prepared masterbatch was 173. When the MTI was omitted from the concentrate, the resulting extrusion composition had a dispersion of 345.

I claim:

1. A carbon black concentrate comprising 30 to 75 weight percent, based on the total weight of the concentrate, polyolefin having a melt index from 0.1 to 100 g/10 min and density greater than 0.910 g/cm$^3$, 25 to 70 weight percent carbon black and 0.20 to 2.5 weight percent mercaptobenzimidazole compound of the formula

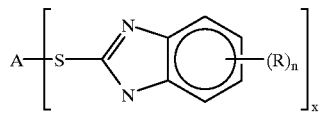

where A is hydrogen or zinc, R is a $C_{1-4}$ alkyl group, n is 0 to 4 and x is 1 or 2.

2. The concentrate of claim 1 additionally containing 0.1 to 2.5 weight percent, based on the total weight of the concentrate, processing aid.

3. The concentrate of claim 2 wherein the processing aid is selected from the group consisting of metal carboxylates and fluoroelastomers.

4. The concentrate of claim 3 wherein the processing aid is zinc stearate.

5. The concentrate of claim 1 wherein the carbon black has a particle size from about 10 up to about 100 nanometers.

6. The concentrate of claim 1 wherein R is methyl and n is 0 or 1.

7. The concentrate of claim 6 wherein the mercaptobenzimidazole compound is selected from the group consisting of 2-mercaptotolylimidazole, 2-mercaptobenzimidazole, zinc 2-mercaptobenzimidazole and zinc 2-mercaptotolylimidazole.

8. The concentrate of claim 7 wherein the mercaptobenzimidazole compound is 2-mercaptotolylimidazole.

9. The concentrate of claim 7 wherein the mercaptobenzimidazole compound is zinc 2-mercaptotolylimidazole.

10. The concentrate of claim 1 wherein the polyolefin is an ethylene homopolymer or copolymer of ethylene and a $C_{3-8}$ α-olefin or functionalized comonomer selected from the group consisting of vinyl carboxylates, alkyl acrylates and alkyl methacrylates.

11. The concentrate of claim 10 wherein the polyolefin is LDPE or LLDPE.

12. The concentrate of claim 1 containing 35 to 65 weight percent polyolefin, 35 to 65 weight percent carbon black and 0.3 to 1.5 weight percent mercaptobenzimidazole compound.

13. A process for producing carbon black-filled polyolefin extrusion compositions having improved carbon black dispersion comprising melt-blending a carbon black concentrate and extrusion-grade polyolefin base resin at a weight ratio of the respective components from 1:5 to 1:25; said carbon black concentrate comprising 30 to 75 weight percent, based on the weight of the concentrate, polyolefin having a melt index from 0.1 to 100 g/10 min and density greater than 0.910g/cm$^3$, 25 to 70 weight percent carbon black and 0.25 to 2.5 weight percent mercaptobenzimidazole compound of the formula

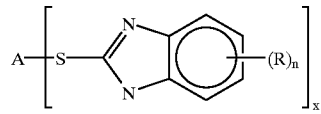

where A is hydrogen or zinc, R is a $C_{1-4}$ alkyl group, n is 0 to 4 and x is 1 or 2.

14. The process of claim 13 wherein the weight ratio of concentrate to polyolefin resin is from 1:10 to 1:20.

15. The process of claim 13 wherein the concentrate contains 35 to 65 weight percent carbon black having a particle size from 1 to 60 nanometers and R is methyl or n is zero or 1.

16. The process of claim 13 wherein the concentrate polyolefin and extrusion-grade polyolefin base resin are selected from the group consisting of ethylene homopolymers and copolymers of ethylene with $C_{3-8}$ α-olefins and functionalized comonomers selected from the group consisting of vinyl carboxylates, alkyl acrylates and alkyl methacrylates.

17. The carbon black-filled polyolefin extrusion composition produced by the process of claim 13 having a dispersion number less than 250.

18. The extrusion composition of claim 17 having a melt index from 0.1 to 15 g/10 min.

19. The extrusion composition of claim 17 wherein the carbon black is present in an amount from 0.75 to 35 weight percent.

20. The extrusion composition of claim 19 wherein the carbon black has a particle size from 10 to 30 nanometers.

21. The extrusion composition of claim 17 wherein the concentrate polyolefin is selected from the group consisting of LDPE and LLDPE.

22. The composition of claim 18 wherein the extrusion-grade polyolefin base resin is selected from the group consisting of LLDPE, MDPE and HDPE.

* * * * *